United States Patent
Kemparaj et al.

(10) Patent No.: US 10,382,191 B2
(45) Date of Patent: Aug. 13, 2019

(54) EFFICIENT UNICAST SIGNALING IN A PRECISION TIME PROTOCOL ENABLED PACKET NETWORK

(71) Applicant: Juniper Networks, Inc., Sunnyvale, CA (US)

(72) Inventors: Prasanth Kemparaj, Bangalore (IN); Satheesh Kumar S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 55 days.

(21) Appl. No.: 15/365,307

(22) Filed: Nov. 30, 2016

(65) Prior Publication Data

US 2018/0152286 A1 May 31, 2018

(51) Int. Cl.
*H04L 7/04* (2006.01)
*H04L 7/033* (2006.01)
*H04L 7/00* (2006.01)
*H04J 3/06* (2006.01)

(52) U.S. Cl.
CPC ............ *H04L 7/041* (2013.01); *H04J 3/0667* (2013.01); *H04L 7/0012* (2013.01); *H04L 7/033* (2013.01)

(58) Field of Classification Search
CPC ... H04L 7/0012; H04L 7/0331; H04L 7/0008; H04L 7/0037; H04L 43/0864; H04L 7/0016; H04L 65/4069; H04L 65/80; H04L 7/0087; H04L 12/40117; H04L 1/203;
(Continued)

(56) References Cited

U.S. PATENT DOCUMENTS

2013/0305048 A1* 11/2013 Yao .................. H04L 9/3073 713/168
2015/0188691 A1* 7/2015 Mizuguchi ............ H04J 3/0667 375/355
(Continued)

FOREIGN PATENT DOCUMENTS

EP      2 816 749      12/2014

OTHER PUBLICATIONS

Wikipedia, "Precision Time Protocol," https://en.wikipedia.org/wiki/Precision_Time_Protocol, Nov. 29, 2016, 7 pages.
(Continued)

*Primary Examiner* — David C Payne
*Assistant Examiner* — Sarah Hassan
(74) *Attorney, Agent, or Firm* — Harrity & Harrity, LLP

(57) ABSTRACT

A first device may provide, to a second device, a first message that includes a first request for a first type of precision time protocol (PTP) message and a second request for a second type of PTP message. The first device may receive, from the second device, a second message based on the first message. The second message may identify whether the first request and the second request are granted. The first device may provide, to the second device, a third message that instructs the second device to provide a first set of messages, associated with the first type of PTP message, and a second set of messages associated with the second type of PTP message. The first device may synchronize a first clock of the first device with a second clock of the second device based on the first set of messages and the second set of messages.

20 Claims, 9 Drawing Sheets

(58) Field of Classification Search
CPC .. H04L 25/4902; H04L 47/283; H04L 47/622
USPC .......................................... 375/257; 370/503
See application file for complete search history.

(56) References Cited

U.S. PATENT DOCUMENTS

2016/0277138 A1* 9/2016 Garg ................... H04L 41/0668
2017/0288802 A1* 10/2017 Qiao ......................... H04L 7/00

OTHER PUBLICATIONS

Extended European Search Report corresponding to EP 17164011.3 dated Oct. 18, 2017, 10 pages.
Mayer, "Draft G.8265.1 IEEE1588TM profile for telecom (frequency delivery without support from network nodes)," Apr. 11, 2011, vol. 13/15, 20 pages.

* cited by examiner

REQUEST_UNICAST_TRANSMISSION TLV

| Bits | | | | | | | | Octets | TLV Offset |
|---|---|---|---|---|---|---|---|---|---|
| 7 | 6 | 5 | 4 | 3 | 2 | 1 | 0 | | |
| TLV Type | | | | | | | | 2 | 0 |
| Length | | | | | | | | 2 | 2 |
| Signaling Type | | | | | Sign Type | | | 1 | 4 |
| LogInterMessagePeriod | | | | | | | | 1 | 5 |
| durationField | | | | | | | | 4 | 6 |

400

GRANT_UNICAST_TRANSMISSION TLV

| Bits | | | | | | | | Octets | TLV Offset |
|---|---|---|---|---|---|---|---|---|---|
| 7 | 6 | 5 | 4 | 3 | 2 | 1 | 0 | | |
| TLV Type | | | | | | | | 2 | 0 |
| Length | | | | | | | | 2 | 2 |
| Signaling Type | | | Grant Type | | | | | 1 | 4 |
| LogInterMessagePeriod | | | | | | | | 1 | 5 |
| durationField | | | | | | | | 4 | 6 |
| Reserved | | | | | | | | 1 | 10 |
| 0 | 0 | 0 | 0 | 0 | 0 | 0 | R | 1 | 11 |

EFFICIENT UNICAST SIGNALING IN A PRECISION TIME PROTOCOL ENABLED PACKET NETWORK

BACKGROUND

The Institute of Electrical Engineers (IEEE) 1588v2 standard defines the Precision Time Protocol (PTP), which is a packet based two-way message exchange protocol for synchronizing clocks between nodes (e.g., network devices, such as routers, switches, etc.) in a network. A network device may act as a source (e.g., a master clock) or a destination (e.g., slave clock) for PTP messages. Unicast negotiation is a mechanism by which a master device and slave device negotiate transmission rates for PTP messages, such as announce, synchronization, and delay response messages.

SUMMARY

According to some possible implementations, a first device may include one or more processors to provide, to a second device, a first message that includes a first request for a first type of precision time protocol (PTP) message and a second request for a second type of PTP message. The first type of PTP message may be different from the second type of PTP message. The one or more processors may receive, from the second device, a second message based on the first message. The second message may identify whether the first request and the second request are granted. The one or more processors may provide, to the second device, a third message that instructs the second device to provide a first set of messages, associated with the first type of PTP message, and a second set of messages associated with the second type of PTP message. The first device may synchronize a first clock of the first device with a second clock of the second device based on the first set of messages and the second set of messages.

According to some possible implementations, a non-transitory computer-readable medium may store one or more instructions that, when executed by one or more processors of a master device, cause the one or more processors to receive, from a slave device, a first message including a first request for a first type of clock synchronization message and a second request for a second type of clock synchronization message. The first type of clock synchronization message may be different from the second type of clock synchronization message. The one or more instructions may cause the one or more processors to provide, to the slave device and based on the first message, a second message that grants the first request and the second request. The one or more instructions may cause the one or more processors to receive, from the slave device, a third message that instructs the master device to provide a set of clock synchronization messages. The set of clock synchronization messages may include the first type of clock synchronization message and the second type of clock synchronization message. The one or more instructions may cause the one or more processors to provide, to the slave device, the set of clock synchronization messages to permit the slave device to synchronize a slave clock with a master clock of the master device.

According to some possible implementations, a method may include providing, by a first device and to a second device, a first message that includes a first request for announce messages, a second request for synchronization messages, and a third request for delay response messages. The method may include receiving, by the first device and from the second device, a second message that includes information that is responsive to the first request, the second request, and the third request. The method may include providing, by the first device and to the second device, a third message that enables the second device to provide synchronization messages and delay response messages to the first device. The synchronization messages and the delay response messages may permit the first device to synchronize a first clock, of the first device, with a second clock of the second device.

BRIEF DESCRIPTION OF THE DRAWINGS

FIG. 5 is a diagram of an example message structure associated with a grant unicast transmission message;

DETAILED DESCRIPTION

Figure 1A:
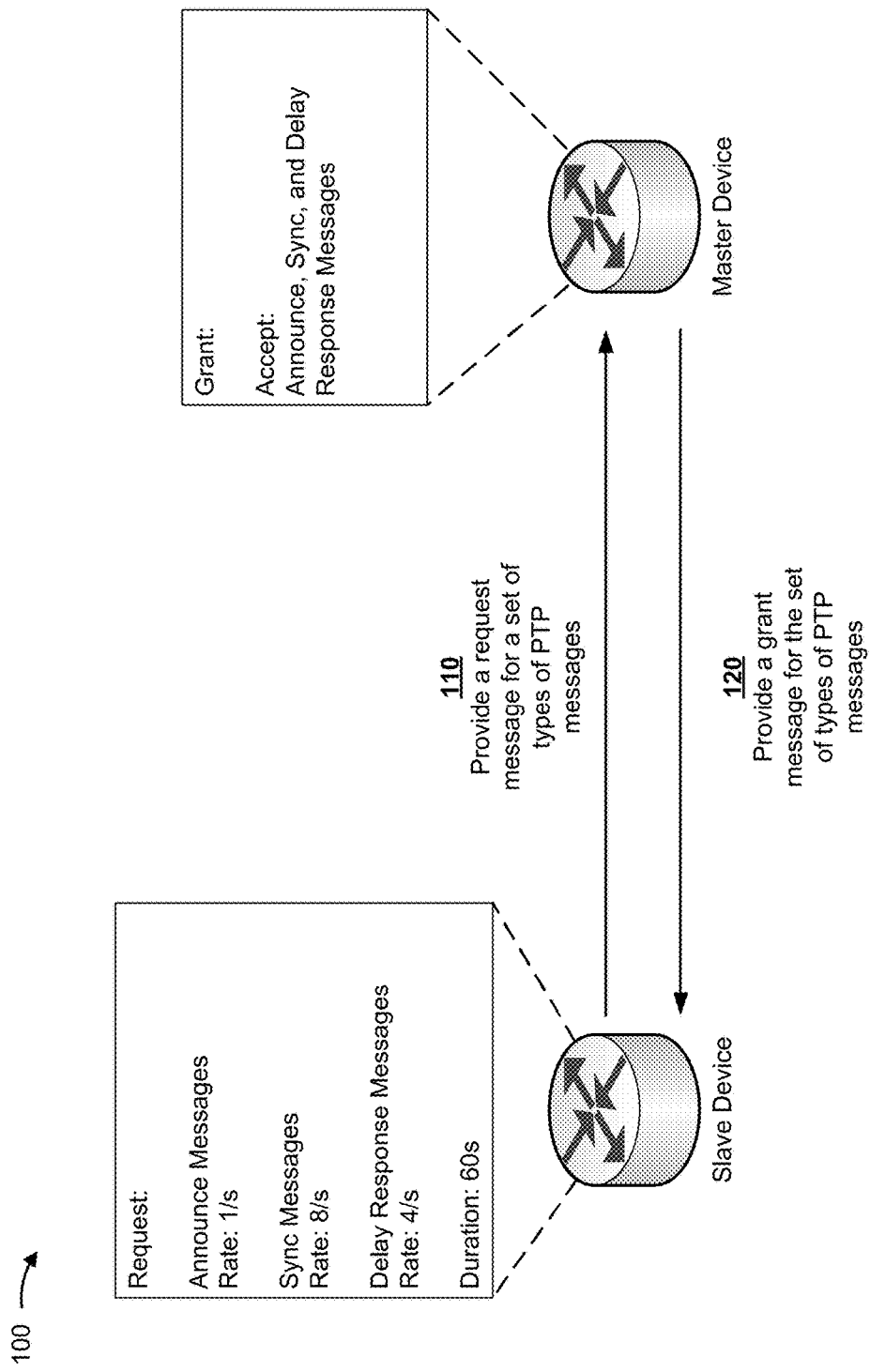
FIGS. 1A-1C are diagrams of an overview of an example implementation described herein.

The following detailed description of example implementations refers to the accompanying drawings. The same reference numbers in different drawings may identify the same or similar elements.

Network devices may implement PTP to distribute frequency, phase, and/or time information that enables synchronization of clocks of the network devices throughout a packet network. A master device (e.g., a device implementing a grandmaster clock) may transmit PTP messages to slave devices (e.g., devices implementing ordinary clocks, boundary clocks, etc.) to enable the slave devices to synchronize respective clocks with a clock of the master device. For example, the master device may provide PTP messages, such as announce messages, synchronization messages, and/or delay response messages (e.g., based on receipt of delay request messages from the slave device) that enable the slave device to synchronize a clock of the slave device with a clock of the master device.

Before a slave device receives, from the master device, the PTP messages that are used for clock synchronization, the slave device and the master device may perform unicast negotiation to negotiate transmission rates of the PTP messages. That is, the slave device may provide multiple signaling messages to establish respective PTP sessions with the master device. For example, a PTP session may refer to the exchange of announce messages, synchronization messages, and/or delay response messages (e.g., based on receipt of delay request messages) between the master device and the slave device.

To establish the respective PTP sessions, multiple signaling messages are exchanged between the master device and the slave device. For example, the slave device may initially provide an announce request message that includes information identifying the requested PTP message type (e.g., announce), that identifies a requested transmission rate at which the master device is to provide announce messages to the slave device, and information that identifies a duration for which the master device is to provide the announce messages (e.g., a grant period).

If the master device determines that the master device may support the request, then the master provides an announce grant message that identifies that the request has been granted. Additionally, the master device may provide an announce message that includes various parameters of the clock of the master device (e.g., timing quality information, variance information, priority information, or the like). The slave device may receive, from multiple master devices, announce messages, and select a particular master device for which to receive PTP messages based on an algorithm (e.g., the "best master clock algorithm (BMCA)," or the like).

Based on selecting a particular master device, the slave device may then provide additional signaling messages, such as a synchronization (sync) request message and a delay response signaling request message. Additionally, the master device may provide corresponding signaling messages in response, such as a synchronization grant message and a delay response grant message, respectively. Thus, in order to establish the one or more PTP sessions, a total of six signaling messages are exchanged. The master device and the slave device may iteratively exchange signaling messages based on respective expirations of the PTP sessions (e.g., at the expiration of the grant period, such as every minute, every three minutes, every five minutes, etc.).

As the number of supported slave devices increases for a master device and/or a particular port of the master device, processor and/or memory resources of the master device are consumed. As an example, assume that the master device supports 256 slave devices, and that grant periods are configured for a minute. In this case, a total of 1536 signaling messages (e.g., 6 signaling messages×256 slave devices=1536) are exchanged for a particular grant period. As the number of slave devices in the network increases, the number of signaling messages respectively increases (e.g., 512 slave devices=3072 signaling messages, etc.). For example, a master device may support hundreds, thousands, etc. of slave devices. Thereby, an extensive number of signaling messages may be exchanged for every grant period.

Implementations described herein enable a slave device to provide an aggregated signaling message that includes one or more requests for particular types of PTP messages (e.g., an announce request, a sync request, and/or a delay response request). Additionally, implementations described herein enable a master device to provide an aggregated signaling message that includes one or more types of grants (e.g., an announce grant, a sync grant, and/or a delay response grant). The slave device may provide, based on the signaling message that includes the one or more types of grants and/or an announce message, an enable message that identifies that the master device is to provide the one or more types of requested PTP messages. In this way, implementations described herein reduce a quantity of signaling messages associated with unicast negotiation, thereby conserving processor and/or memory resources of the master device and/or the slave device, and/or conserving network resources. Additionally, in this way, implementations described herein enable a master device to support an increased number of slave devices.

Additionally, implementations described herein enable a slave device to select a particular master device, from which to receive PTP messages, based on information associated with an announce message, and/or based on information associated with a sync grant and/or a delay response grant. In this way, implementations described herein enable a slave device to select a master device based on more complete information than as compared to situations where the slave device selects a master device based on information associated with an announce message solely. In this way, implementations described herein enable the slave device to determine whether the master device may support the sync request and/or the delay response request before the slave device selects the master device to provide the various PTP messages. Thereby, implementations described herein conserve processor and/or memory resources of the master device and/or the slave device, and/or conserve network resources by reducing a number of instances where a slave device selects a master device that is incapable of supporting one or more requests of the slave device.

While implementations herein describe PTP and/or 1588v2, it should be understood that implementations herein are applicable to other types of time-transfer and/or synchronization protocols. Additionally, while implementations herein describe particular types of messages, other implementations include other types of messages that are used for clock synchronization between network devices.

Figure 1B:
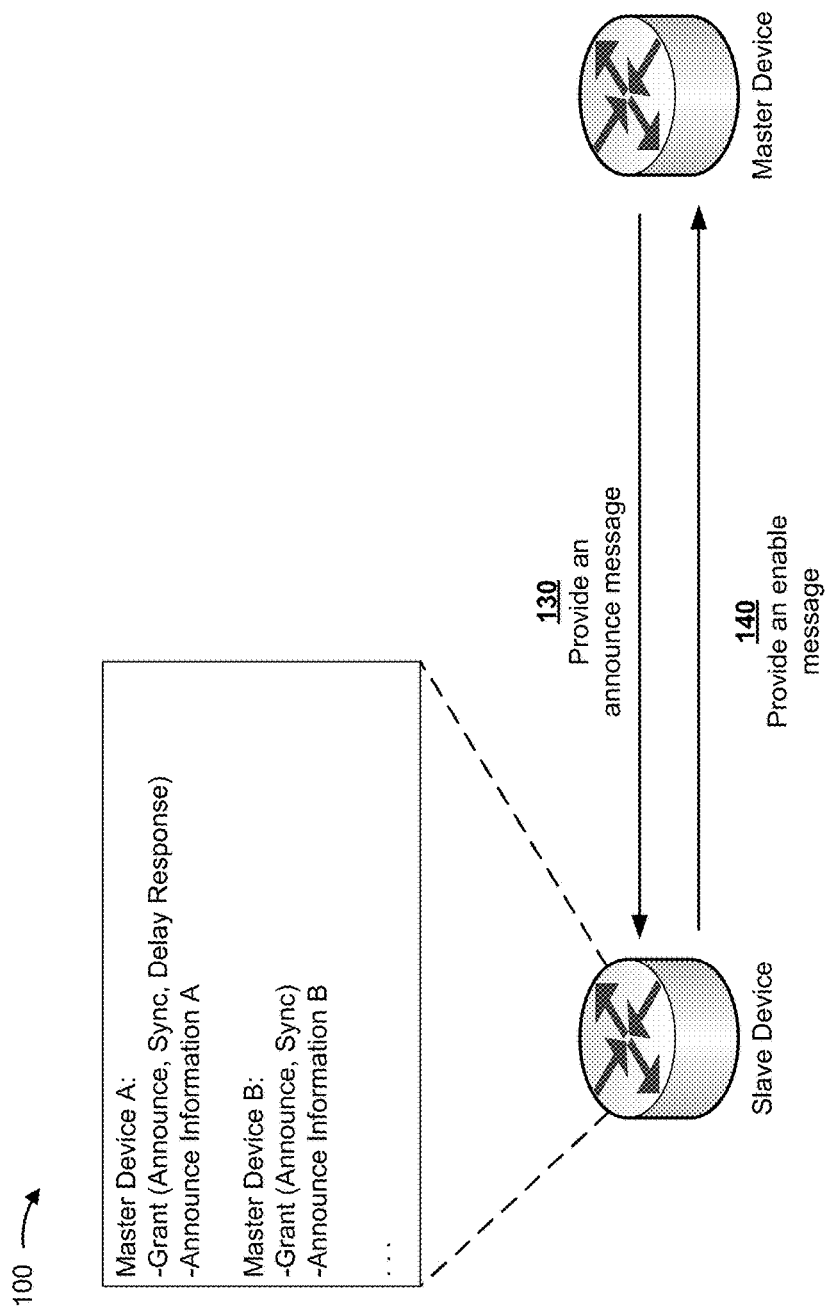
Figure 1C:
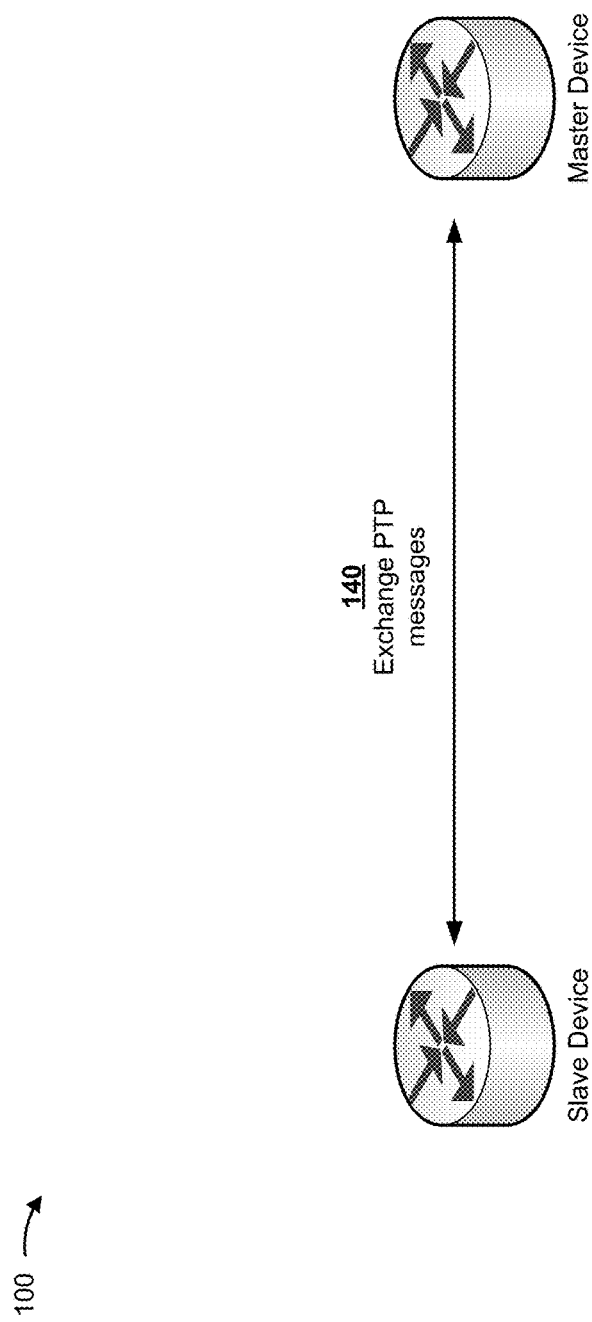

FIGS. 1A-1C are diagrams of an overview of an example implementation 100 described herein. As shown in FIG. 1A, and by reference number 110, a slave device (e.g., a network device) may provide, to a master device (e.g., a network device), a request message for a set of types of PTP messages. For example, the set of types of PTP messages may include announce messages, sync messages, and delay response messages. The request message may include information that identifies requested transmission rates of the respective types of PTP messages, and a requested grant period.

The master device may receive the request message and determine whether the requests may be supported. For example, assume that the master device determines that the master device is capable of providing announce messages, sync messages, and delay response messages at the respective requested transmission rates for the requested grant period. As shown by reference number 120, the master device may provide, to the slave device, a grant message for the set of types of PTP messages. For example, the grant message may include information that identifies that the master device has granted each request associated with the request message.

As shown in FIG. 1B, and by reference number 130, the master device may provide, to the slave device, an announce message that includes particular clock information of the master device. For example, assume that the master device shown in FIG. 1A is "Master Device A." The slave device may receive announce messages from multiple master devices, and select a particular master device based on information associated with the announce messages and/or information associated with respective grant messages. Assume that the slave device selects the master device (e.g., "Master Device A") to provide PTP messages. For example, as shown, another master device (e.g., "Master Device B") is incapable of supporting a request for delay response messages, whereas "Master Device A" is capable of supporting each type of PTP message. As shown by reference number 140, the slave device may provide an enable message that instructs the master device to provide the PTP messages for the grant period.

As shown in FIG. 1C, and by reference number 140, the master device and the slave device may exchange PTP messages based on the enable message. For example, the master device may provide, to the slave device, announce messages, sync messages, and delay response messages for the grant period. In this way, the slave device and the master device may perform unicast negotiation based on exchanging three signaling messages (e.g., the request message, the grant message, and the enable message). In this way, implementations described herein reduce a number of signaling messages that are exchanged in association with unicast negotiation, thereby conserving processor and/or memory resources of the slave device and the master device and/or conserving network resources.

As indicated above, FIGS. 1A-1C are provided merely as an example. Other examples are possible and may differ from what was described with regard to FIGS. 1A-1C.

Figure 2:
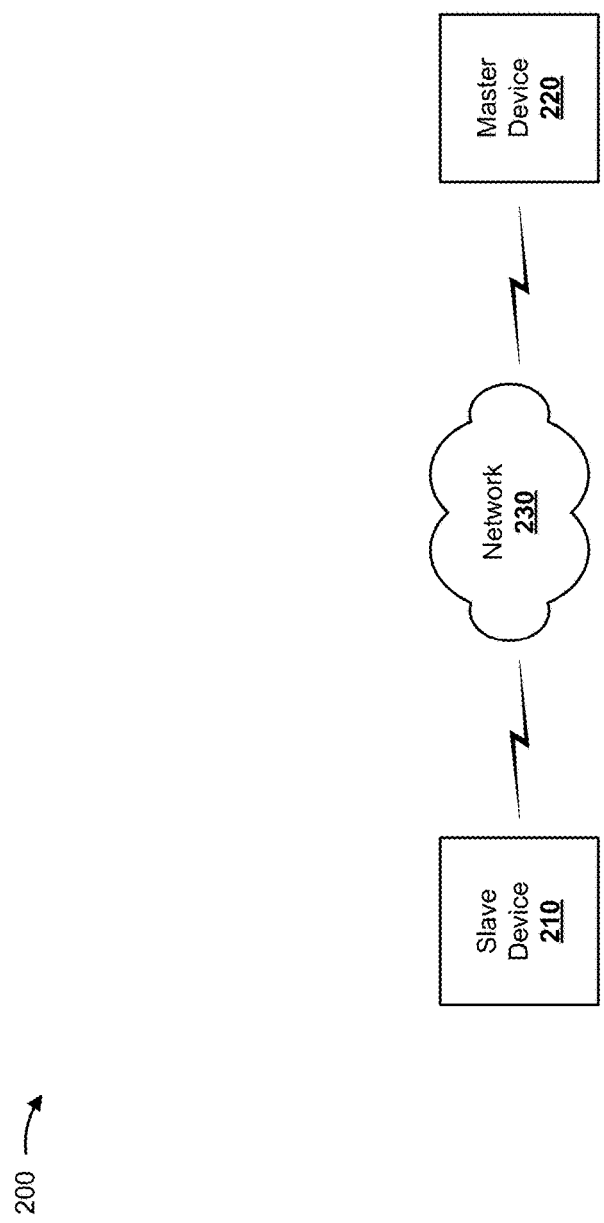
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a slave device 210, a master device 220, and a network 230. Devices of environment 200 may interconnect via wired connections, wireless connections, or a combination of wired and wireless connections.

Slave device 210 includes one or more network devices (e.g., one or more traffic transfer devices) capable of processing and transferring network traffic. For example, slave device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, slave device 210 may receive PTP messages from master device 220, and synchronize a clock (e.g., a slave clock) of slave device 210 with a clock (e.g., a master clock) of master device 220 based on the PTP messages.

Master device 220 includes one or more network devices (e.g., one or more traffic transfer devices) capable of processing and transferring network traffic. For example, master device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, master device 220 may provide PTP messages to slave device 210.

Network 230 includes one or more wired and/or wireless networks. For example, network 230 may include a cellular network (e.g., a fifth generation (5G) network, a long-term evolution (LTE) network, a code division multiple access (CDMA) network, a third generation (3G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
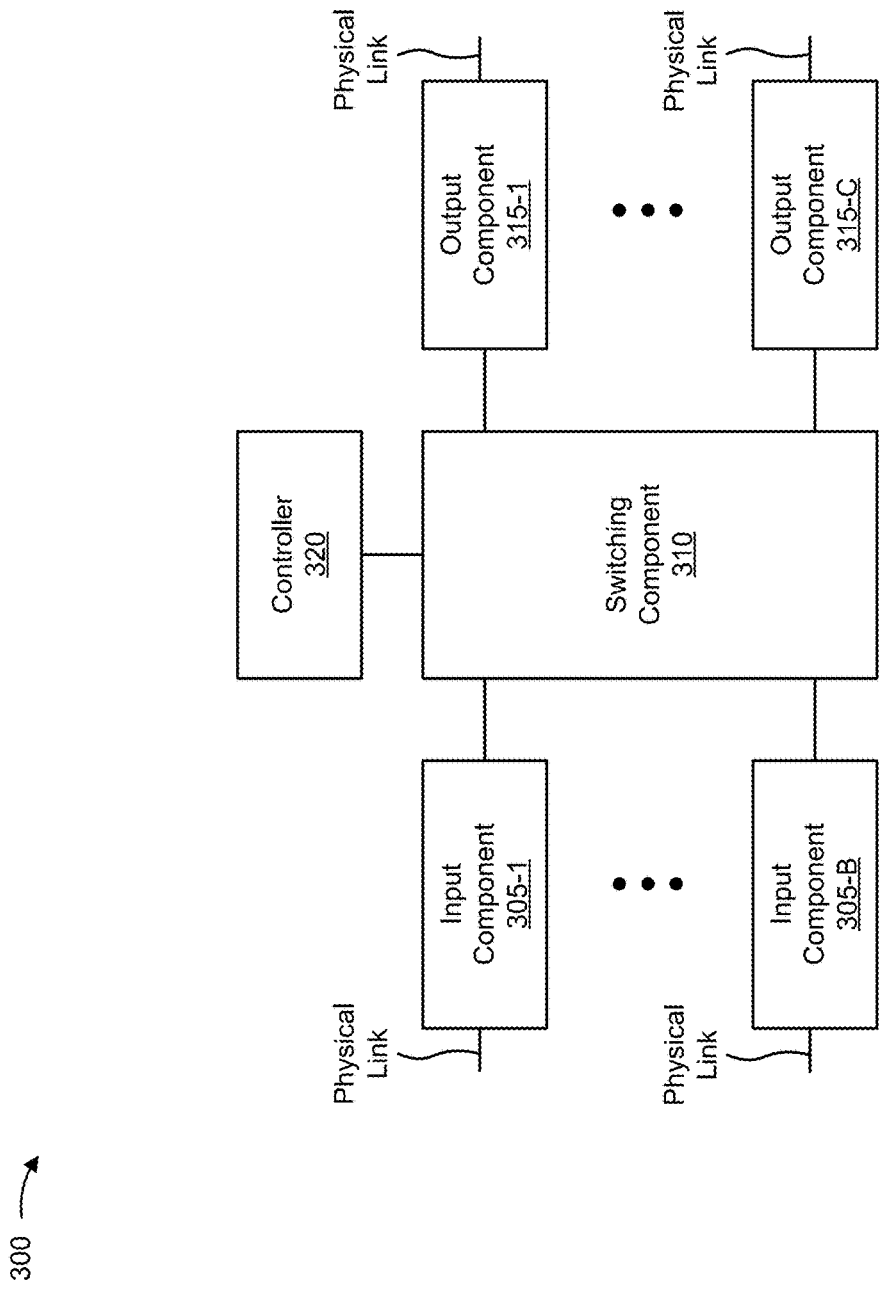
FIG. 3 is a diagram of example components of one or more devices of FIG. 2.

FIG. 3 is a diagram of example components of a device 300. Device 300 may correspond to slave device 210 and/or master device 220. In some implementations, slave device 210 and/or master device 220 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor that takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
FIG. 4 is a diagram of an example message structure associated with a request unicast transmission message.

FIG. 4 is a diagram of an example message structure 400 associated with a request unicast transmission message. For example, slave device 210 may provide, to master device 220, a request message, including a message structure 400 as shown in FIG. 4, to request master device 220 to provide one or more types of PTP messages to slave device 210 at particular transmission rates for a particular grant period.

As used herein, a message may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

As shown in FIG. 4, the request unicast transmission message may include a "Type Length Value (TLV) Type" field, a "Length" field, a "Signaling Type" field, a "Sign Type" field, a "LogInterMessagePeriod" field, a "duration-Field" field, an "Octets" field, and a "TLV Offset" field. In some implementations, the "TLV type" field may include information that identifies a type of signaling message (e.g., "request unicast transmission" type of signaling message). In some implementations, the "Length" field may include information that identifies a length of the message (e.g., a number of fields associated with the message, a number of bytes, a number of offsets, etc.).

In some implementations, the "Signaling Type" field may include information that identifies requested types of PTP messages (e.g., announce messages, sync messages, and/or delay response messages). For example, as described in connection with FIG. 7, slave device 210 may include information that identifies a particular value in association with the "Signaling Type" field to request particular types of PTP messages from master device 220. In this way, slave device 210 may request multiple types of PTP messages using a single signaling message rather than multiple signaling messages, thereby conserving processor and/or memory resources of slave device 210 and/or master device 220, and/or conserving network resources.

In some implementations, the "Sign Type" field may include information that identifies signs (e.g., positive or negative) associated with values used to determine transmission rates of the particular types of PTP messages. In some implementations, the "LogInterMessagePeriod" field may include information that identifies values used to determine transmission rates of the particular types of PTP messages. For example, a requested transmission rate may be determined based on the form of $2^{nth}$ power, where n is equal to a value associated with the "LogInterMessagePeriod" field. As an example, a value of "−3" may yield a transmission rate of eight messages per second (e.g., $2^{-3}$=0.125, which translates to one message per 0.125 seconds). A value associated with the "Sign Type" Field may identify the sign of the value associated with the "LogInterMessagePeriod" field.

In some implementations, the "durationField" field may include information that identifies a requested grant period (e.g., a time frame) for which master device 220 is to provide the requested types of PTP messages at the requested transmission rates.

In some implementations, the "Octets" field may include information that identifies a number of octets associated with a particular field. For example, the "Length" field may be associated with two octets (e.g., 2 bytes). In some implementations, the "TLV Offset" field may include information that identifies a position of a particular field of the message in association with the message structure (e.g., where the field begins, where the field ends, or the like).

Although FIG. 4 shows an example of a message structure for a request unicast transmission message, in some implementations, a request unicast transmission message may include additional fields, fewer fields, different fields, or differently arranged fields than those depicted in FIG. 4.

FIG. 5 is a diagram of an example message structure 500 associated with a grant unicast transmission message. For example, master device 220 may provide, to slave device 210, a grant message, including message structure 500 as shown in FIG. 5, to accept or reject one or more of the requests for the types of PTP messages.

As shown in FIG. 5, the grant unicast transmission message may include a "TLV Type" field, a "Length" field, a "Signaling Type" field, a "Grant Type" field, a "LogInterMessagePeriod" field, a "durationField" field, a set of "Reserved" fields, an "R" field, an "Octets" field, and a "TLV Offset" field. In some implementations, the "TLV type" field may include information that identifies a type of signaling message (e.g., "grant unicast transmission" type of signaling message). In some implementations, the "Length" field may include information that identifies a length of the message. In some implementations, the "Signaling Type" field may include information that identifies the requested types of PTP messages.

In some implementations, the "Grant Type" field may include information that identifies whether master device 220 accepts or rejects some or all of the requests associated with the request unicast transmission message. For example, as described in connection with FIG. 7, master device 220 may include information that identifies a particular value in association with the "Grant Type" field, which may be used by slave device 210 to identify particular requests that are accepted or rejected.

In some implementations, the "LogInterMessagePeriod" field may include information that identifies values used to determine transmission rates of the particular types of PTP messages. In some implementations, the "durationField" field may include information that identifies the requested grant period for which master device 220 is to provide the requested types of PTP messages at the requested transmission rates.

In some implementations, the "R" field may include information that identifies the likelihood of a granting port (e.g., of master device 220) granting a subsequent request of a requesting port (e.g., of slave device 210). As an example, a particular value (e.g., "TRUE") associated with the "R" field may identify that a granting port of master device 220 is likely to renew a grant for a subsequent grant period when a requesting port of slave device 210 repeats a request.

In some implementations, the "Octets" field may include information that identifies a number of octets associated with a particular field. In some implementations, the "TLV Offset" field may include information that identifies a position of a particular field of the message in association with the message structure. In some implementations, the "Reserved" field may include a field that is reserved for use by slave device 210 (e.g., information that identifies a particular value, such as a bit sequence of "0,0,0,0,0,0,0,0").

Although FIG. 5 shows an example of a message structure for a grant unicast transmission message, in some implementations, a grant unicast transmission message may include additional fields, fewer fields, different fields, or differently arranged fields than those depicted in FIG. 5.

Figure 6:
FIG. 6 is a diagram of an example message structure associated with a cancel unicast transmission message and/or an acknowledgement of a cancel unicast transmission message.

FIG. 6 is a diagram of an example message structure 600 associated with a cancel unicast transmission message and/or an acknowledgement of a cancel unicast transmission message. For example, slave device 210 may provide, to master device 220, the cancel unicast transmission message, including message structure 600 as shown in FIG. 6, to cancel one or more PTP sessions. Additionally, or alternatively, master device 220 may provide, to slave device 210, the acknowledgement of the cancel unicast transmission message, including message structure 600 as shown in FIG. 6, to acknowledge the cancellation of one or more PTP sessions.

As shown in FIG. 6, the cancel unicast transmission message and/or the acknowledgement of the cancel unicast transmission message may include a "TLV Type" field, a "Length" field, a "Signaling Type" field, a set of "Reserved" fields, an "Octets" field, and a "TLV Offset" field. In some implementations, the "TLV Type" field may include information that identifies a type of signaling message (e.g., "cancel unicast transmission" type of signaling message or "acknowledgement of the cancel unicast transmission message" type of signaling message). In some implementations, the "Length" field may include information that identifies a length of the message. In some implementations, the "Signaling Type" field may include information that identifies particular types of PTP messages for which master device 220 is to cancel transmission (e.g., cancel PTP sessions).

In some implementations, the "Octets" field may include information that identifies a number of octets associated with a particular field. In some implementations, the "TLV Offset" field may include information that identifies a position of a particular field of the message in association with the message structure. In some implementations, the "Reserved" fields may include fields that are reserved for use by slave device 210.

Although FIG. 6 shows an example of a message structure for a cancel unicast transmission message and/or the acknowledgement of the cancel unicast transmission message, in some implementations, a cancel unicast transmission message and/or the acknowledgement of the cancel unicast transmission message may include additional fields, fewer fields, different fields, or differently arranged fields than those depicted in FIG. 6.

Figure 7:
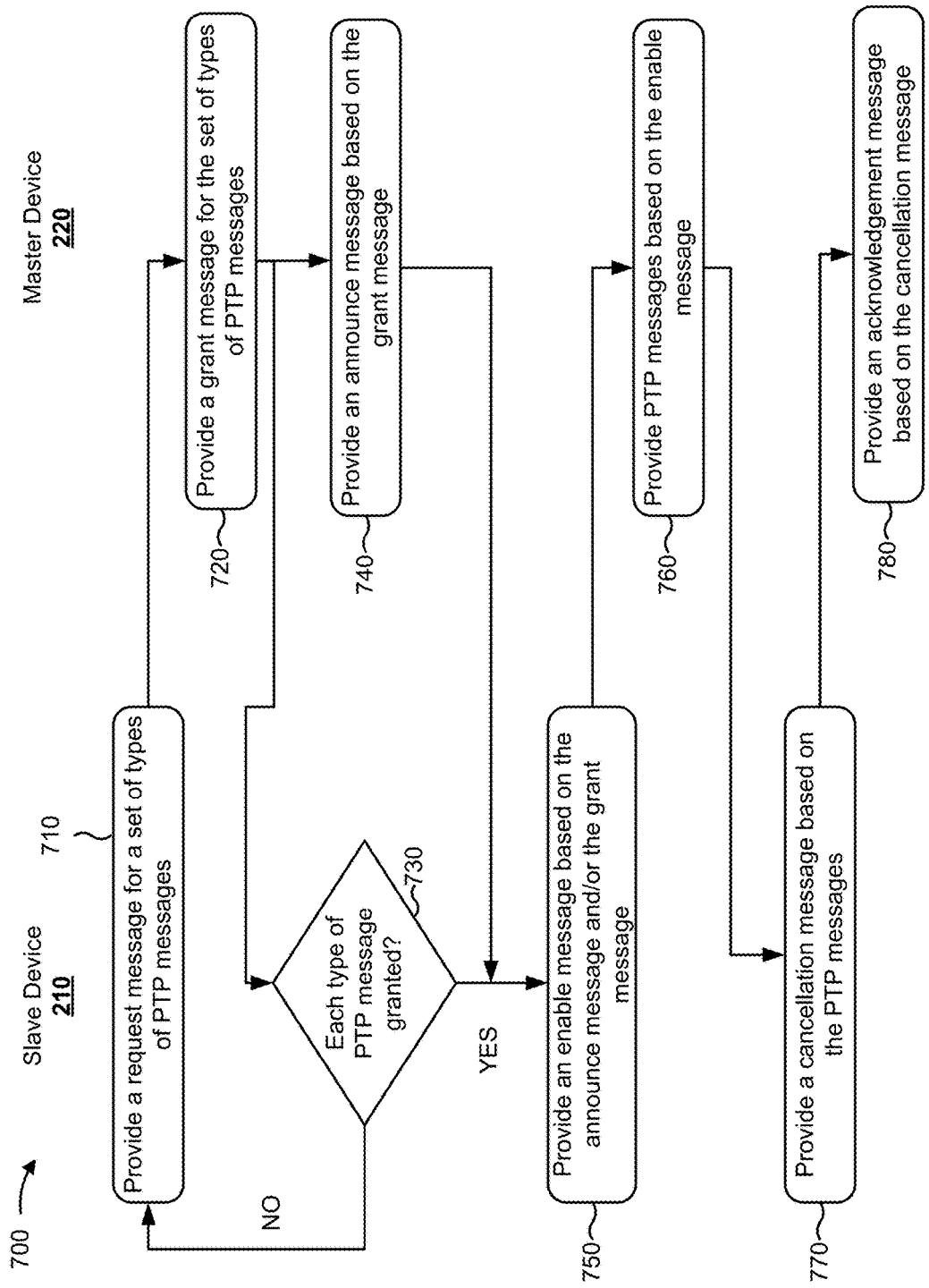
FIG. 7 is a flow chart of an example process for enabling efficient unicast signaling in a PTP packet network.

FIG. 7 is a flow chart of an example process 700 for enabling efficient unicast signaling in a PTP enabled packet network. In some implementations, one or more process blocks of FIG. 7 may be performed by slave device 210 and/or master device 220.

As shown in FIG. 7, process 700 may include providing a request message for a set of types of PTP messages (block 710). For example, slave device 210 may provide, to master device 220, a request message (e.g., a "request unicast transmission" message) for a set of types of PTP messages. In some implementations, slave device 210 may provide the request message to select a particular master device 220 (e.g., from which to receive PTP messages for clock synchronization). In some implementations, slave device 210 may provide, to multiple master devices 220, request messages, and select a particular master device 220, of the multiple master devices 220, based on respective grant messages, as described elsewhere herein.

In some implementations, the request message may request master device 220 to provide, to slave device 210, one or more types of PTP messages (e.g., clock synchronization messages, such as announce messages, sync messages, delay response messages, and/or other types of clock synchronization messages) to slave device 210 for a requested grant period, and/or in association with requested transmission rates. As used herein, a type of PTP message may refer to a particular PTP message that is used for clock synchronization.

In some implementations, slave device 210 may provide a request message that includes a message structure as shown in FIG. 4. For example, in association with the "TLV Type" field, slave device 210 may store information that identifies that the message is a request unicast transmission message. Additionally, or alternatively, in association with the "Length" field, slave device 210 may store information that identifies a value of six (e.g., identifying that six fields are associated with the request message).

In some implementations, slave device 210 may store, in the "Signaling Type" field, information that identifies the set of types of PTP messages that slave device 210 is requesting from master device 220. For example, as shown in Table 1 below, slave device 210 may store information that identifies a particular value in association with the "Signaling Type" field to identify requested types of PTP messages:

TABLE 1

Signaling Type Values

| Bit | Bit | Bit | Bit | Hex | Signaling Type | Signaling Class |
|---|---|---|---|---|---|---|
| 0 | 0 | 0 | 0 | 0 | Sync | Signaling One |
| 0 | 0 | 0 | 1 | 1 | One Way | Signaling All |
| 0 | 0 | 1 | 0 | 2 | Two Way | Signaling All |
| 0 | 0 | 1 | 1 | 3 | Announce, Sync | Signaling Many |
| 0 | 1 | 0 | 0 | 4 | Sync, Delay Response | Signaling Many |
| 0 | 1 | 0 | 1 | 5 | Announce, Delay Response | Signaling Many |
| 0 | 1 | 1 | 0 | 6 | Reserved | |
| 0 | 1 | 1 | 1 | 7 | Reserved | |
| 1 | 0 | 0 | 0 | 8 | Reserved | |
| 1 | 0 | 0 | 1 | 9 | Delay Response | Signaling One |
| 1 | 0 | 1 | 0 | A | Reserved | |
| 1 | 0 | 1 | 1 | B | Announce | Signaling One |
| 1 | 1 | 0 | 0 | C | Reserved | |
| 1 | 1 | 0 | 1 | D | Reserved | |
| 1 | 1 | 1 | 0 | E | Reserved | |
| 1 | 1 | 1 | 1 | F | Reserved | |

As an example, if slave device 210 is configured to request transmission of each type of PTP message (e.g., announce messages, sync messages, and delay response messages), then slave device 210 may store, in the "Signaling Type" field, information that identifies the hexadecimal value "2" (e.g., associated with the bit sequence "0,0,1,0"). In some implementations, "Signaling Class" may refer to the number, and/or types, of PTP messages that are associated with the request. For example, hexadecimal values "0," "9," and "B" may refer to "Signaling One" (e.g., requesting a single type of PTP message), hexadecimal values "1" and "2" may refer to "Signaling All" (e.g., requesting each type of PTP message), and hexadecimal values "3," "4," and "5" may refer to "Signaling Many" (e.g., requesting multiple types of PTP messages, a particular combination of PTP messages, or the like).

In this way, slave device 210 may request transmission of multiple types of PTP messages using a single request message rather than multiple separate request messages. Thereby, implementations described herein conserve processor and/or memory resources of slave device 210 and/or master device 220, and/or conserve network resources. While particular hexadecimal values and/or bit sequences are shown in Table 1 as corresponding to particular requests, other implementations may include other hexadecimal values and/or bit sequences that correspond to other types of requests.

In some implementations, slave device 210 may store, in the "Sign Type" field, information that identifies the signs of the values associated with the "LogInterMessagePeriod" field. For example, as shown in Table 2 below, slave device 210 may store information that identifies a value in association with the "Sign Type" field to identify particular signs that are used to determine transmission rates:

TABLE 2

Sign Type Values

| Bit | Bit | Bit | Bit | Hex | Announce | Sync | Delay Response |
|---|---|---|---|---|---|---|---|
| 0 | 0 | 0 | 0 | 0 | − | − | − |
| 0 | 0 | 0 | 1 | 1 | − | − | + |
| 0 | 0 | 1 | 0 | 2 | − | + | − |
| 0 | 0 | 1 | 1 | 3 | − | + | + |
| 0 | 1 | 0 | 0 | 4 | + | − | − |
| 0 | 1 | 0 | 1 | 5 | + | − | + |
| 0 | 1 | 1 | 0 | 6 | + | + | − |
| 0 | 1 | 1 | 1 | 7 | + | + | + |
| 1 | 0 | 0 | 0 | 8 | Reserved | | |
| 1 | 0 | 0 | 1 | 9 | Reserved | | |
| 1 | 0 | 1 | 0 | A | Reserved | | |
| 1 | 0 | 1 | 1 | B | Reserved | | |
| 1 | 1 | 0 | 0 | C | Reserved | | |
| 1 | 1 | 0 | 1 | D | Reserved | | |
| 1 | 1 | 1 | 0 | E | Reserved | | |
| 1 | 1 | 1 | 1 | F | Reserved | | |

As an example, the hexadecimal value "1" (e.g., associated with the bit sequence "0,0,0,1") indicates that a requested transmission rate of an announce message is associated with a negative sign, a requested transmission rate of a sync message is associated with a negative sign, and that a requested transmission rate of a delay response is associated with a positive sign. While particular hexadecimal values and/or bit sequences are shown in Table 2, other implementations may include other hexadecimal values and/or bit sequences that correspond to sign designations.

In some implementations, slave device 210 may store, in the "LogInterMessagePeriod" field, information that is used to determine requested transmission rates associated with the set of requested types of PTP messages. For example, as shown in Table 3 below, slave device 210 may store information that identifies a value in association with the "LogInterMessagePeriod" that is used to determine requested transmission rates of the PTP messages:

TABLE 3

Transmission Rate Values

| Announce | Sync | Delay Response | LogInterMessagePeriod Value |
|---|---|---|---|
| 0 | 0 | 0 | 0 |
| 0 | 0 | 1 | 1 |
| 0 | 0 | 2 | 2 |
| ... | ... | ... | ... |
| 1 | 3 | 0 | 88 |
| 1 | 3 | 1 | 89 |
| 1 | 3 | 2 | 90 |
| ... | ... | ... | ... |
| 3 | 7 | 5 | 253 |
| 3 | 7 | 6 | 254 |
| 3 | 7 | 7 | 255 |

In some implementations, slave device 210 and/or master device 220 may determine a transmission rate value in a similar manner as described above in connection with FIG. 4. In some implementations, a value associated with the "LogInterMessagePeriod" field may correspond (e.g., map) to particular values associated with announce, sync, and delay response messages. For example, the value "89" of the "LogInterMessagePeriod" field may correspond to a set of values, such as a value one for announce, a value of three for sync, and a value of one for delay response. In some implementations, master device 220 and/or slave device 210 may store information that maps a value of the "LogInterMessagePeriod" field to a set of values associated with PTP messages.

In some implementations, master device 220 may determine requested transmission rates based on the following expression:

Requested transmission rate=$2^n$

As an example, and assuming that "Sign Type" field is associated with the hexadecimal value "1," the "LogInterMessagePeriod" field including information that identifies the hexadecimal value of "89" (e.g., associated with the bit sequence "0,1,0,1,1,0,0,1") indicates that a requested transmission rate for announce messages is two messages per second (e.g., $2^{-1}$=0.5, which translates to a message per 0.5 seconds), a requested transmission rate for sync messages is eight messages per second (e.g., $2^{-3}$=0.125, which translates to a message per 0.125 seconds), and that a requested transmission rate for delay response messages is one message per two seconds (e.g., $2^{1}$=2, which translates to a message per two seconds). For example, master device 220 may use a set of values for n based on the set of values that map to the value associated with the "LogInterMessagePeriod" field. As another example, for the hexadecimal value "255," master device 220 may determine a value "3" for announce messages, a value "7" for sync messages, and a value "7" for delay response messages. Additionally, master device 220 may determine requested transmission rates using the particular values (e.g., announce messages=$2^{-3}$, sync messages=$2^{-7}$, and delay response messages=$2^{-7}$).

While implementations herein describe calculations of transmission rates using particular techniques and/or values, other implementations include other types of techniques and/or other values for determining transmission rates. Additionally, while Table 3 includes particular values that correspond to transmission rates, other implementations include other values that correspond to other transmission rates.

In some implementations, slave device 210 may store, in the "durationField" field, information that identifies a requested grant period, such as a time frame for which master device 220 is to provide the requested types of PTP messages at the requested transmission rates.

In some implementations, slave device 210 may store information in association with various fields of the request message, and provide, to master device 220, the request message for the set of types of PTP messages. In this way, slave device 210 may request multiple types of PTP messages using a single signaling message, thereby conserving processor and/or memory resources of slave device 210 and/or master device 220, and/or conserving network resources.

As further shown in FIG. 7, process 700 may include providing a grant message for the set of types of PTP messages (block 720). For example, master device 220 may receive the request message for the set of types of PTP messages, determine whether master device 220 may support some or all of the requests, and provide a grant message for the set of PTP message types.

In some implementations, master device 220 identify the requested set of types of PTP messages based on information associated with the "Signaling Type" field of the request message, identify requested transmission rates associated with the requested types of PTP messages based on information associated with the "Sign Type" field and information associated with the "LogInterMessagePeriod" field, and identify the requested grant period based on the information associated with the "durationField" field. Additionally, or alternatively, master device 220 may determine whether master device 220 may support the requests. For example, master device 220 may determine if master device 220 is capable of providing, to slave device 210, the requested types of PTP messages at the requested transmission rates for the requested grant period (e.g., based on available resources of master device 220, based on a number of existing PTP sessions, or the like).

In some implementations, master device 220 may provide a grant message including the message structure shown in FIG. 5. In some implementations, master device 220 may store, in the "Grant Type" field, information that identifies the requested types of PTP messages that master device 220 has accepted, has rejected, or the like. For example, as shown in Table 4 below, master device 220 may store information that identifies a value in association with the "Grant Type" field to identify requested types of PTP messages that have been accepted or rejected by master device 220:

TABLE 4

Grant Type Values

| Bit | Bit | Bit | Bit | Hex | Grant Type |
|---|---|---|---|---|---|
| 0 | 0 | 0 | 0 | 0 | Reject |
| 0 | 0 | 0 | 1 | 1 | Accept Delay Response |
| 0 | 0 | 1 | 0 | 2 | Accept Sync |
| 0 | 0 | 1 | 1 | 3 | Accept Sync and Delay Response |
| 0 | 1 | 0 | 0 | 4 | Accept Announce |
| 0 | 1 | 0 | 1 | 5 | Accept Announce and Delay Response |
| 0 | 1 | 1 | 0 | 6 | Accept Announce and Sync |
| 0 | 1 | 1 | 1 | 7 | Accept |
| 1 | 0 | 0 | 0 | 8 | Reserved |
| 1 | 0 | 0 | 1 | 9 | Reserved |
| 1 | 0 | 1 | 0 | A | Reserved |
| 1 | 0 | 1 | 1 | B | Reserved |
| 1 | 1 | 0 | 0 | C | Reserved |
| 1 | 1 | 0 | 1 | D | Reserved |
| 1 | 1 | 1 | 0 | E | Reserved |
| 1 | 1 | 1 | 1 | F | Reserved |

As an example, the hexadecimal value of "7" indicates that master device 220 has accepted (e.g., granted) the requests for announce messages, sync messages, and delay response messages at the requested transmission rates for the requested duration. As another example, the hexadecimal value of "3" indicates that master device 220 has accepted the requests for sync messages and delay response messages, and has rejected the request for announce messages. Alternatively, as described elsewhere herein, the request message may have included requests for only sync messages and delay response messages (e.g., did not include a request for announce messages). In this case, the hexadecimal value of "3" indicates that all of the requests, associated with the request message, were granted. While particular values are shown in connection with Table 4, other implementations include other values that correspond to other grant types.

In some implementations, master device 220 may provide, to slave device 210, the grant message, thereby enabling slave device 210 to determine whether to select master device 220 to provide PTP messages to slave device 210, as described below. For example, slave device 210 may receive grant messages from multiple master devices 220, and select a particular master device 220, of the master devices 220, based on the grant messages and/or an announce message, as described elsewhere herein.

As further shown in FIG. 7, process 700 may include determining whether each request, for respective types of PTP messages, is granted (block 730). For example, slave device 210 may receive the grant message, identify a value associated with the "Grant Type" field, and determine the requests, for respective types of PTP messages, that were granted or rejected.

In some implementations, slave device 210 may determine that some requests, for particular types of PTP messages, were rejected by master device 220. For example, assume that the request message included information identifying the hexadecimal value of "2" in association with the "Signaling Type" field (e.g., indicating that announce messages, sync messages, and delay response messages were requested). Additionally, assume that the grant message included information identifying the hexadecimal value of "6" in association with the "Grant Type" field (e.g., indicating that requests for announce messages and sync messages were accepted, and the request for delay response messages was rejected). In this case, slave device 210 may provide, to master device 220, another request message that includes information identifying the hexadecimal value of "9" in association with the "Signaling Type" field (e.g., indicating that slave device 210 is requesting delay response messages). Additionally, or alternatively, slave device 210 may provide, to master device 220, another request message that includes information identifying the hexadecimal value of "2" (e.g., requesting each type of PTP message again to determine if a different response is provided).

In some implementations, slave device 210 may determine that each request, for respective types of PTP messages, was rejected by master device 220. For example, slave device 210 may identify information identifying the hexadecimal value of "0" in association with the "Grant Type" field. In this case, slave device 210 may provide, to master device 220, another request message that includes information identifying the same hexadecimal value, in association with the "Signaling Type" field, as present in the initial request message.

As further shown in FIG. 7, process 700 may include providing an announce message based on the grant message (block 740). For example, master device 220 may provide, to slave device 210, an announce message based on the grant message. For example, if master device 220 grants the request for announce messages, then master device 220 may provide, to slave device 210, an announce message. In some implementations, the announce message may include information associated with a clock of master device 220 (e.g., priority information, clock class information, accuracy information, variance information, or the like). In this way, slave device 210 may determine, based on the announce message, whether to provide an enable message to master device 220, as described below.

In some implementations, slave device 210 may receive, from multiple master devices 220, grant messages, and use information associated with the grant messages to determine a particular master device 220 to select. As an example, assume that a first master device 220 grants each type of request for respective PTP messages, and that a second master device grants a subset of requests for respective PTP messages. In this case, slave device 210 may select the first master device 220 (e.g., because each type of request was granted, because the first master device 220 may support the requests, or the like).

As further shown in FIG. 7, if each request, for respective PTP messages, is granted (block 730—YES), then process 700 may include providing an enable message based on the announce message and/or the grant message (block 750). For example, slave device 210 may provide, to master device 220, an enable message based on each request, for respective types of PTP messages, being granted and/or based on the announce message.

In some implementations, slave device 210 may receive announce messages from multiple master devices 220. Additionally, or alternatively, slave device 210 may perform a technique (e.g., using a BMCA, or another master clock selection algorithm) to determine a particular master device 220 for which to receive PTP messages.

In some implementations, if slave device 210 selects a particular master device 220 and/or if the particular master device 220 has granted the requests for the particular types of PTP messages, then slave device 210 may provide an enable message to the particular master device 220. In some implementations, the enable message may include information that instructs master device 220 to provide the requested types of PTP messages to slave device 210 for the requested grant period.

In this way, slave device 210 may determine a particular master device 220 for which to provide PTP messages based on information associated with an announce message, and based on granted requests for different types of PTP messages. In this way, implementations described herein reduce a number of instances where slave device 210 selects a particular master device 220 that is incapable of supporting requests for PTP messages. Thereby, implementations described herein conserve processor and/or memory resources of slave device 210 and master device 220, and/or conserve network resources.

As further shown in FIG. 7, process 700 may include providing PTP messages based on the enable message (block 760). For example, master device 220 may receive, from slave device 210, the enable message, and provide the requested types of PTP messages to slave device 210, thereby enabling slave device 210 to synchronize a clock of slave device 210 with a clock of master device 220 using PTP synchronization techniques.

As further shown in FIG. 7, process 700 may include providing a cancellation message based on the PTP messages (block 770). For example, slave device 210 may provide, to master device 220, a cancellation message that instructs master device 220 to cancel the transmission of particular types of PTP messages to slave device 210.

In some implementations, slave device 210 may provide a cancellation message including the message structure as shown in FIG. 6. For example, slave device 210 may store, in association with the "Signaling Type" field, information that identifies the particular type (or types) of PTP messages for which master device 220 is to cancel transmission. For example, slave device 210 may select to cancel each type of PTP message (e.g., for which slave device 210 is receiving messages), select to cancel a subset of types of PTP messages, or the like. In some implementations, slave device 210 may cancel a particular type of PTP message, and provide another request message for the type of PTP message (e.g., to request a different transmission rate, to request a different grant period, or the like).

As further shown in FIG. 7, process 700 may include providing an acknowledgment message based on the cancellation message (block 780). For example, master device 220 may provide, to slave device 210, an acknowledgment message based on the cancellation message.

In some implementations, master device 220 may provide a cancellation message including the message structure as shown in FIG. 6. For example, master device 220 may store, in association with the "Signaling Type" field, information that identifies the particular type (or types) of PTP messages for which master device 220 is acknowledging cancellation of transmission.

In this way, implementations described herein enable master device 220 and slave device 210 to reduce a number of signaling messages that are exchanged in association with unicast negotiation and/or PTP sessions. Thereby, implementations described herein conserve processor and/or memory resources of master device 220 and/or slave device 210, and conserve network resources.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Implementations described herein enable network devices to perform unicast negotiation using a reduced set of signaling messages. For example, by aggregating requests and/or grants for types of PTP messages, network devices may perform unicast negotiation using a reduced number of signaling messages as compared to if particular request messages and/or grant messages are provided individually. In this way, implementations described herein conserve processor and/or memory resources of network devices, and conserve network resources.

Additionally, implementations described herein enable a slave device to select a particular master device based on information associated with an announce message and based on information associated with a grant message. In this way, implementations described herein enable the network device to select a particular master device based on more complete information than as compared to if the network device selects the master device solely based on the announce message. Thereby, implementations described herein reduce a number of instances where a network device selects a particular master device that may not support the requests for sync messages and/or delay response messages. In this way, implementations described herein conserve processor and/or memory resources of network devices and conserve network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
a memory; and
one or more processors to:
provide, to a second device, a first message that includes a first request for a first type of precision time protocol (PTP) message, a second request for a second type of PTP message, and a third request for a third type of PTP message,
the first type of PTP message being different from the second type of PTP message, and
the third type of PTP message being different from the first type of PTP message and the second type of PTP message;
receive, from the second device, a second message based on the first message,
the second message identifying whether the first request and the second request are granted;
determine that the first request and the second request are granted based on the second message; and
provide, to the second device and based on the first request and the second request being granted, a third message that instructs the second device to provide a first set of messages, associated with the first type of PTP message, and a second set of messages associated with the second type of PTP message,
the first device to synchronize a first clock of the first device with a second clock of the second device based on the first set of messages and the second set of messages.

2. The first device of claim 1, where the one or more processors are further to:
determine that the first request for the first type of PTP message was rejected based on the second message; and
provide, to the second device, a fourth message that includes another request for the first type of PTP message.

3. The first device of claim 1,
where the one or more processors are further to:
receive, from the second device, an announce message; and
where the one or more processors, when providing the third message, are to:
provide the third message based on the announce message and the second message.

4. The first device of claim 1, where the first message includes information identifying a first transmission rate associated with the first request, and a second transmission rate associated with the second request.

5. The first device of claim 1, where the one or more processors are further to:
provide, to the second device, a fourth message that includes an instruction that prevents the second device from providing additional PTP messages to the first device.

6. A non-transitory computer-readable medium storing instructions, the instructions comprising:
one or more instructions that, when executed by one or more processors of a first device, cause the one or more processors to:
provide, to a second device, a first message that includes a first request for a first type of precision time protocol (PTP) message, a second request for a second type of PTP message, and information identifying a first transmission rate associated with the first request,
the first type of PTP message being different from the second type of PTP message;
receive, from the second device, a second message based on the first message,
the second message identifying whether the first request and the second request are granted; and
provide, to the second device, a third message that instructs the second device to provide a first set of messages, associated with the first type of PTP message, and a second set of messages associated with the second type of PTP message,
the first device to synchronize a first clock of the first device with a second clock of the second device based on the first set of messages and the second set of messages.

7. The non-transitory computer-readable medium of claim 6, where the first message includes a third request for a third type of PTP message,
the third type of PTP message being different from the first type of PTP message and the second type of PTP message.

8. The non-transitory computer-readable medium of claim 6, where the one or more instructions, when executed by the one or more processors, further cause the one or more processors to:
determine that the first request for the first type of PTP message was rejected based on the second message; and
provide, to the second device, a fourth message that includes a third request for the first type of PTP message.

9. The non-transitory computer-readable medium of claim 6,
where the one or more instructions, when executed by the one or more processors, further cause the one or more processors to:
receive, from the second device, an announce message, and
where the one or more instructions, that cause the one or more processors to provide the third message, cause the one or more processors to:
provide the third message based on the announce message and the second message.

10. The non-transitory computer-readable medium of claim 6, where the first message further includes information identifying a second transmission rate associated with the second request.

11. The non-transitory computer-readable medium of claim 6, where the one or more instructions, when executed by the one or more processors, further cause the one or more processors to:
provide, to the second device, a fourth message that includes an instruction that prevents the second device from providing additional PTP messages to the first device.

12. A method comprising:
providing, by a first device to a second device, a first message that includes a first request for a first type of precision time protocol (PTP) message and a second request for a second type of PTP message,
the first type of PTP message being different from the second type of PTP message;
receiving, by the first device and from the second device, a second message based on the first message;
receiving, by the first device, an announce message; and
providing, by the first device and based on the announce message and the second message, a third message that instructs the second device to provide a first set of messages, associated with the first type of PTP message, and a second set of messages associated with the second type of PTP message,
the first device to synchronize a first clock of the first device with a second clock of the second device based on the first set of messages and the second set of messages.

13. The method of claim 12, where the first message includes a third request for a third type of PTP message,
the third type of PTP message being different from the first type of PTP message and the second type of PTP message.

14. The method of claim 12, further comprising:
determining that the first request and the second request are granted based on the second message,
where the third message is provided further based on the first request and the second request being granted.

15. The method of claim 12, further comprising:
determining that the first request for the first type of PTP message was rejected based on the second message; and
providing, to the second device, a fourth message that includes a third request for the first type of PTP message.

16. The method of claim 12,
where the announce message is received from the second device, and where the third message is provided to the second device.

17. The method of claim 12, where the first message includes information identifying a first transmission rate associated with the first request, and a second transmission rate associated with the second request.

18. The method of claim 12, where the second message identifies whether the first request and the second request are granted.

19. The method of claim 12, where the announce message includes timing quality information or variance information.

20. The method of claim 12, further comprising:
providing, to the second device, a fourth message that includes an instruction that prevents the second device from providing additional PTP messages to the first device.

* * * * *